Patented Nov. 21, 1961

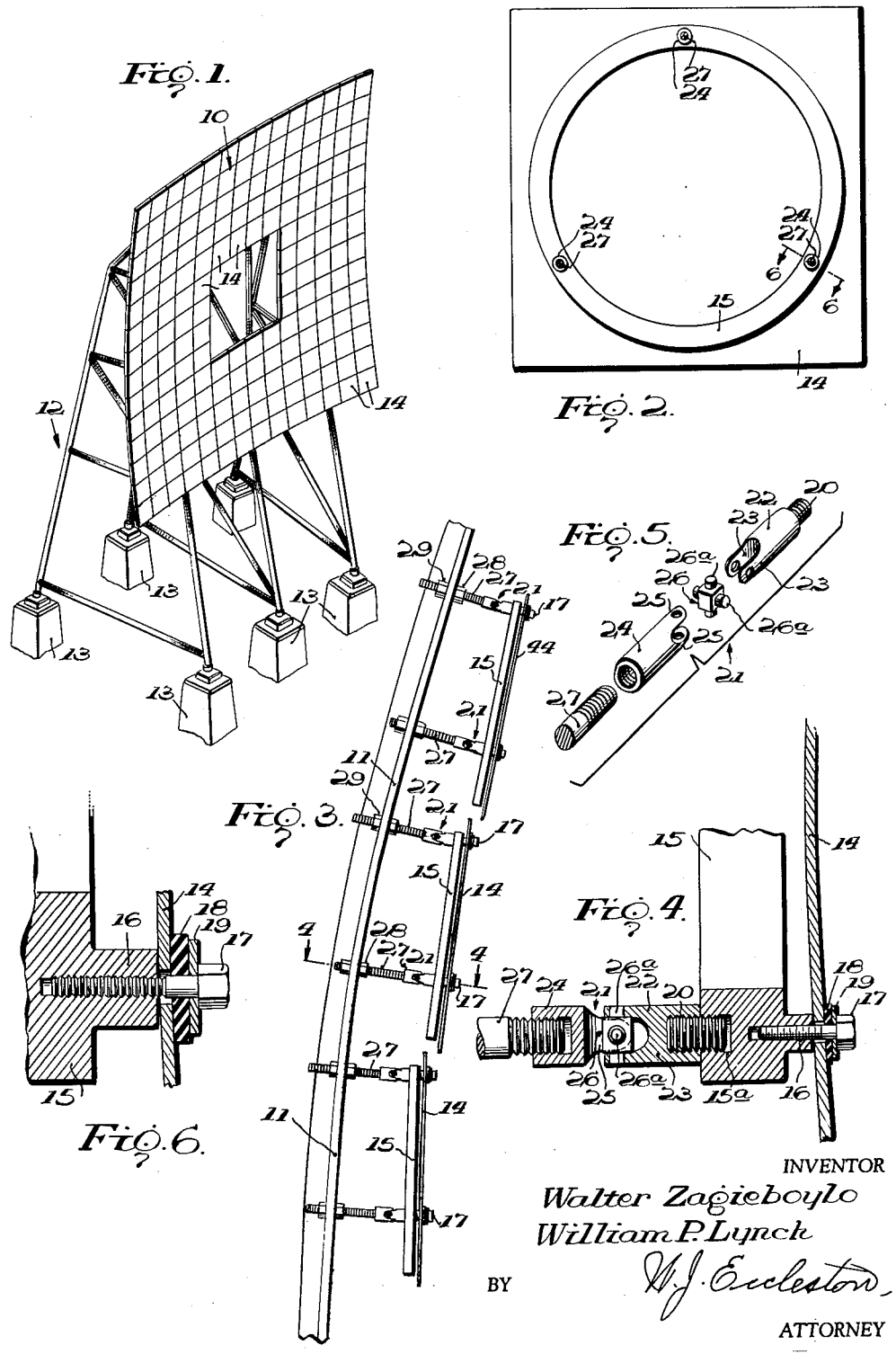

3,009,391
COMBINED MIRROR SUPPORTING OR MOUNTING, ADJUSTING, AND LOCKING MEANS
Walter Zagieboylo, Norfolk, and William Paul Lynch, Cochituate, Mass., assignors to the United States of America as represented by the Secretary of the Army
Filed Nov. 18, 1958, Ser. No. 774,788
6 Claims. (Cl. 88—84)
(Granted under Title 35, U.S. Code (1952), sec. 266)

The invention described herein, if patented, may be manufactured and used by or for the Government for governmental purposes, without the payment to us of any royalty thereon.

The present invention relates to a combined mirror supporting or mounting, adjusting, and locking means which is adapted particularly, although not exclusively for use in connection with the solar ray concentrator of a solar furnace, such, for example, as that disclosed in the copending application of Eugene S. Cotton and John M. Davies, Serial No. 729,218, filed April 17, 1958, now Patent No. 2,987,961.

While the means constituting the present invention was evolved for use with solar furnace concentrators, it is of such a character as to be easily adapted for other uses within a wide range, including the mounting and adjusting of curved surfaces of glass, or other fragile material, as well as curved reflective or non-reflective metal members, without inducing excessive stresses in such material.

Heretofore, for example, if a known multiple mirror solar concentrator was to approximate a spherically concave surface, the individual mirrors which were used to make up the same had to take the form of a fragment of a spherically concave surface, or if the concentrator was to be paraboloidal, the individual mirrors had to take the form of a fragment of a parabola. Such concentrators, including as they did, a relatively large number of individual mirrors, differing from each other in contour and curvature, were required to form the concentrator, so that individual mirrors could not be produced by mass production methods. Therefore, since each of the multiplicity of individual mirrors had to be accurately made to prevent aberration when the individual mirrors were assembled to form the concentrator, the cost of the mirrors alone was excessive. This excessive cost has been overcome by virtue of the fact that a multiplicity of like spherically concave mirrors have been used to form the ingenious concentrator of the aforesaid copending application.

The present invention has to do, therefore, with novel means for mounting or supporting, adjusting, and locking the individual square spherically concave mirrors of the said concentrator.

The more important objects of the present invention are to provide a new and improved mirror mount, or support means, for a spherically curved mirror, which is of relatively simple and inexpensive construction; which is efficient and easy to operate; which permits rapid and accurate adjustment of focal length (translation) and optical focusing by changing the angle of the mirror normal to the framework of the concentrator, without inducing stress in the mirror due to its adjustment; which provides adequate support and positive locking of the mirror in place; and which is especially suitable for the mounting of a great number of substantially like, or identical, and relatively large and heavy curved mirrors upon a common framework, namely, the spherically curved supporting framework of a solar concentrator.

Another object of the invention is to provide new and improved combined means for the supporting or mounting, adjusting, and locking of the above-referred-to spherically concave individual mirrors to a similarly curved or shaped supporting framework of a solar concentrator.

A further object of the invention is to provide novel mounting, adjusting, and locking means for each of the multiplicity of individual duplicate mirrors so that they will each focus the parallel solar rays striking them at a common focal point.

Another object of the present invention is to provide combined means for the mounting and universal adjustment of an individual curved mirror to a desired adjusted position with relation to the supporting framework of the concentrator and then the locking of said mirror in said position of adjustment.

The foregoing and other objects and advantages of the present invention will be apparent from the following description and appended claims when considered in conjunction with the accompanying drawings wherein like reference characters designate corresponding parts in the several views.

In said drawing:

FIG. 1 is a perspective view of a solar ray concentrator in its entirety and in accordance with the Cotton and Davies application, afore-mentioned, showing the front faces of the multiplicity of spherically curved rectangular or square individual mirrors being supported by the novel mounting means of the present invention;

FIG. 2 is a rear elevational view of one of the individual curved mirrors taken from the rear thereof and showing part of the supporting means therefor;

FIG. 3 is an enlarged vertical fragmentary edge view of a part of the concentrator frame and its adjustably supported mirrors;

FIG. 4 is an enlarged fragmentary sectional view taken substantially along the line 4—4 of FIG. 3, looking in the direction of the arrows;

FIG. 5 is an exploded view of the several parts or details of one of the universal joint type of mirror-supporting and adjusting means or members embodying the present invention; and FIG. 6 is an enlarged fragmentary sectional view taken substantially along the line 6—6 of FIG. 2, looking in the direction of the arrows.

The present invention was evolved as the result of a need for means, or a device, which could be used as a mounting attachment for fastening curved rectangular mirrors to a solar furnace concentrator framework and which would permit the easy and accurate adjustment and optical focusing of each of the individual mirrors; would allow the accurate translation of each mirror within a few inches nearer to, or farther from, the supporting framework; would provide for the positive locking of each individual mirror in place upon said framework as well as a good support to the mirror surface, without inducing stress due to adjusting it; and which also would aid in overcoming the effects of mirror weight and wind distortion of the mirror.

With particular reference to FIG. 1 of the drawing, the concentrator for use in connection with a solar furnace and with which the present invention is employed, is shown in its entirety at 10. A spherically curved grid-like framework 11 (see FIG. 3) is supported by an upright master frame, shown as a whole at 12, the latter being mounted upon and anchored to a base or foundation, such as a plurality of concrete pillars 13.

Framework 11 provides means for supporting a multiplicity of substantially like individual spherically curved mirrors 14. Each of the individual curved mirors is directly mounted upon a supporting member in the form of a circular ring 15 having on one face, namely, its forward face or surface, spaced projecting portions or lugs 16, three such lugs being employed and being equidistantly spaced, as will be apparent from observing FIG. 2 of the drawing.

The mirror 14 is held to or mounted upon ring 15 by means of a plurality of threaded studs or bolts 17, three such being shown in FIG. 2, the bolts being passed through previously-formed holes or openings in mirror 14 and being threaded into the lugs 16 and ring 15. Mirror 14 has a circular line contact with the ring lugs 16 and is cushioned by means of compressible washers 18 which are backed up by metallic washers 19. The washers are disposed between the heads of bolts 17 and the outer face or surface of the mirror 14, as best seen in FIG. 6. The centered circular ring 15 presents the intersection of two plane surfaces to the back or inner convex side or surface of the spherically curved mirror 14 in such a manner that a circular line contact is formed which corresponds to the intersection of a plane to the spherical surface. In practice, the outside diameter of ring 15 is slightly less than the smallest peripheral edge of mirror 14.

The rear or inner face or surface of the circular ring 15 is provided with three equidistantly spaced sockets 15a, into each of which there is threaded a threaded stud 20, see particularly FIG. 4. These studs 20 provide means for supporting three universal joints or couplings, one such being shown, as a whole, at 21 in FIG. 4. Each of the universal joints 21 consists of a joint member or body portion 22 which is internally threaded to permit its threaded connection to stud 20, and has a pair of opposed jaws 23. A second joint member or body portion 24 is provided for cooperation with member 22, and has a pair of similar jaws 25. The two members are interconnected by means of a connecting block member, shown as a whole at 26. The joint member 24 is internally threaded to receive and support a threaded stud 27. The connecting block 26 carries pivot pins 26a which are adapted to engage aligned holes or bearings in the jaws 23 and 25 to hold the several parts of the joint 21 in assembled relationship, as seen in FIG. 4.

Three such universal joints 21 and three like threaded studs 27 are provided for association with each individual mirror 14 and its supporting circular ring 15. As best seen in FIG. 3, these threaded studs 27 extend through oversize holes (not shown) formed in the spherical supporting frame 11. Each stud 27 carries a nut 28 which is adapted to engage the inside face or surface of the curved grid-like framework 11 and a similar lock nut 29 which is adapted to engage the outside, or rear face of the curved framework 11. These nuts 28 and 29 provide the means for positively locking the individual mirror 14 in a given adjusted position, universal joints 21 providing, in effect, a flexible supporting means to permit the change in angularity or position of the mirror in relation to its spherically curved supporting framework 11.

Each individual mirror 14 is held by its supporting ring 15 as a unit and since the ring is capable of being mounted upon the curved supporting surface or framework 11 without induced stresses, no stresses will be carried to the mirror itself. The use of the universal joints or couplings 21 as the mounting means for the mirror upon its supporting frame 11, eliminates the possibility of stresses being carried to the mirror, and the studs 27 may be easily adjusted and then locked to the spherical framework 11 by means of the nuts 28 and 29.

One method of adjusting and aiming the focal line of each mirror 14, is to move one or more of the nuts 28 and 29 to different positions along the threaded stud or rod 27 and then tighten the corresponding nuts to hold the mirror assembly firmly in position. Thus, to increase the elevation angle of the focal line, the nut 28 which is nearest the universal joint 21 on the uppermost rod, as viewed in FIG. 2, can be moved closer to the universal joint 21, after which the locking nut 29 is tightened to secure the threaded rod 27 firmly. All possible desired combinations of elevation and azimuth angles of the mirror about 25° in any direction from the nominal plane, can be obtained in this manner. For most purposes, however, angles of less than 25° are desired. It is to be understood, of course, that the particular type of universal joint 21 and the length of the threaded rods or studs 27 selected, will determine the maximum angle of a mirror for a particular application.

To move the mirror 14 closer to or farther away from a desired object, such as the focal point, all three sets of nuts 28, 29, would have to be moved an equal amount along their threaded rods 27, thus translating the position of the mirror 14 without, however, altering its elevation or azimuth angle. The strength, as determined by its diameter, and the length of the threaded rod 27, may be varied to suit such a requirement.

The cross-sectional dimensions of the ring 15 may, of course, take any desired configuration as long as a circular line contact around a centered circular section of the spherically curved mirror 14, is maintained.

It is to be understood that the curved framework 11 and its supporting upright framework 12, as well as the foundation pillars 13, form no part of the present invention, said invention being directed to the novel combined means for supporting or mounting, adjusting, and locking the spherically curved mirrors 14 in position upon the spherically curved framework 11.

While a preferred embodiment of the invention has been shown and described, it will be apparent that variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

We claim:

1. Means for mounting, adjusting and releasably locking a spherically curved mirror upon the spherically curved supporting frame of a multiple mirror concentrator for a solar furnace, comprising a circular mirror-supporting ring having circularly spaced projections adapted to receive and support a spherically curved mirror with contacts in a circular line with said spaced projections, bolts at said spaced projections extending through openings in the mirror and threadedly engaging said circular ring at one side thereof to hold the mirror to the ring, universal joint assemblies threadedly connected to the opposite side of the circular ring at the locations of said spaced projections, threaded studs extending outwardly from the universal joint assemblies and through openings formed in the spherically curved supporting frame, said bolts, universal joint assemblies, and said threaded studs being adjustably disposed in coaxial alinement, and a pair of nuts threaded onto each of the threaded studs and disposed at opposite faces of the spherically curved supporting frame, whereby to lock the mirror-supporting ring and spherical mirror in any of its positions of adjustment relative to the spherically curved supporting frame.

2. Means for mounting, adjusting and releasably locking a spherically curved mirror upon the spherical supporting frame of a multiple mirror concentrator for a solar furnace, comprising a circular mirror-supporting ring having a plurality of lugs at circularly spaced points adapted to receive and support a spherically curved mirror with contacts in a circular line with said lugs, bolts at said spaced points extending through openings in the mirror and threadedly engaging the lugs on said circular mirror-supporting ring at one side thereof to hold the mirror to the ring, universal joint assemblies threadedly connected to the opposite side of the circular ring at said spaced points, threaded studs extending outwardly from the universal joint assemblies and through openings formed in the spherical supporting frame, said bolts, universal joint assemblies, and said threaded studs being adjustably disposed in coaxial alinement, and means associated with the threaded studs and spherical supporting frame for locking the spherically curved mirror and its supporting ring in any of its adjusted positions to said frame.

3. Means according to claim 1, wherein the bolts, projections threaded studs, and the universal joint assemblies are disposed at three circularly arranged equidistantly spaced points of the spherical mirror, its circular supporting ring, and its spherically curved supporting frame.

4. Means for adjustably mounting an article formed from glass or the like having a curved surface and being carried by a supporting ring, upon a generally similar curved grid-like supporting framework, comprising spaced universal-joint-like members attached at opposite ends to the back of the glass article-supporting ring and to the face of the curved grid-like supporting framework thereby permitting adjustment of the former relative to the latter, and bolt means disposed at the front face of said curved article for holding the article and its supporting ring to the universal-joint-like members without inducing excessive stresses in said curved article, said universal-joint-like members and said bolt means being disposed in coaxial alinement.

5. Means for adjustably mounting an article formed from glass or the like having a curved surface and being carried by a supporting ring, upon a generally similar curved grid-like supporting framework, comprising spaced universal-joint-like members attached at opposite ends to the back of the glass article-supporting ring and to the face of the curved grid-like supporting framework thereby permitting adjustment of the former relative to the latter, threaded studs having heads and extending through openings in the curved article and into the article-supporting ring to hold them to the universal-joint-like members, said universal-joint-like members and said threaded studs being disposed in coaxial alinement, and means including compressible material disposed between the stud heads and said curved article whereby adjustment of the curved article and its supporting ring may be accomplished without inducing excessive stresses in said curved article.

6. Means for mounting, adjusting and releasably locking a curved article formed from relatively fragile material upon a supporting surface, comprising an annulus having circularly arranged spaced projections being disposed at, and having contact at spaced points with, the back surface of said curved article, spaced threaded holding means extending through preformed holes in said curved article to hold the latter to the projections of said annulus and maintain contact therewith, a plurality of angularly and axially adjustable spaced supporting members connected to said annulus and extending outwardly therefrom at the rear of said curved article and annulus, said adjustable spaced supporting members being attached to said supporting surface, means for effecting the axial adjustment and locking of the spaced supporting members in adjusted position, said threaded holding means and said spaced supporting members being disposed in coaxial alinement, and means including a compressible washer disposed between the spaced threaded holding means and the fornt face of the curved article whereby adjustment of said curved article and annulus relative to said supporting surface may be effected without inducing excessive stresses in the curved article.

References Cited in the file of this patent

UNITED STATES PATENTS

| | | |
|---|---|---|
| 1,248,456 | Clark | Dec. 4, 1917 |
| 1,701,193 | Rolfes | Feb. 5, 1929 |
| 2,707,903 | Trombe | May 10, 1955 |
| 2,771,262 | Laystrom | Nov. 20, 1956 |
| 2,817,998 | Nieuwenhoven | Dec. 31, 1957 |

FOREIGN PATENTS

| | | |
|---|---|---|
| 16,599 | Great Britain | of 1907 |